July 21, 1964   H. J. BIEDINGER   3,141,711
BEARING CAGE

Filed Dec. 7, 1961   3 Sheets-Sheet 1

INVENTOR.
HENRY J. BIEDINGER
BY
ATTORNEY

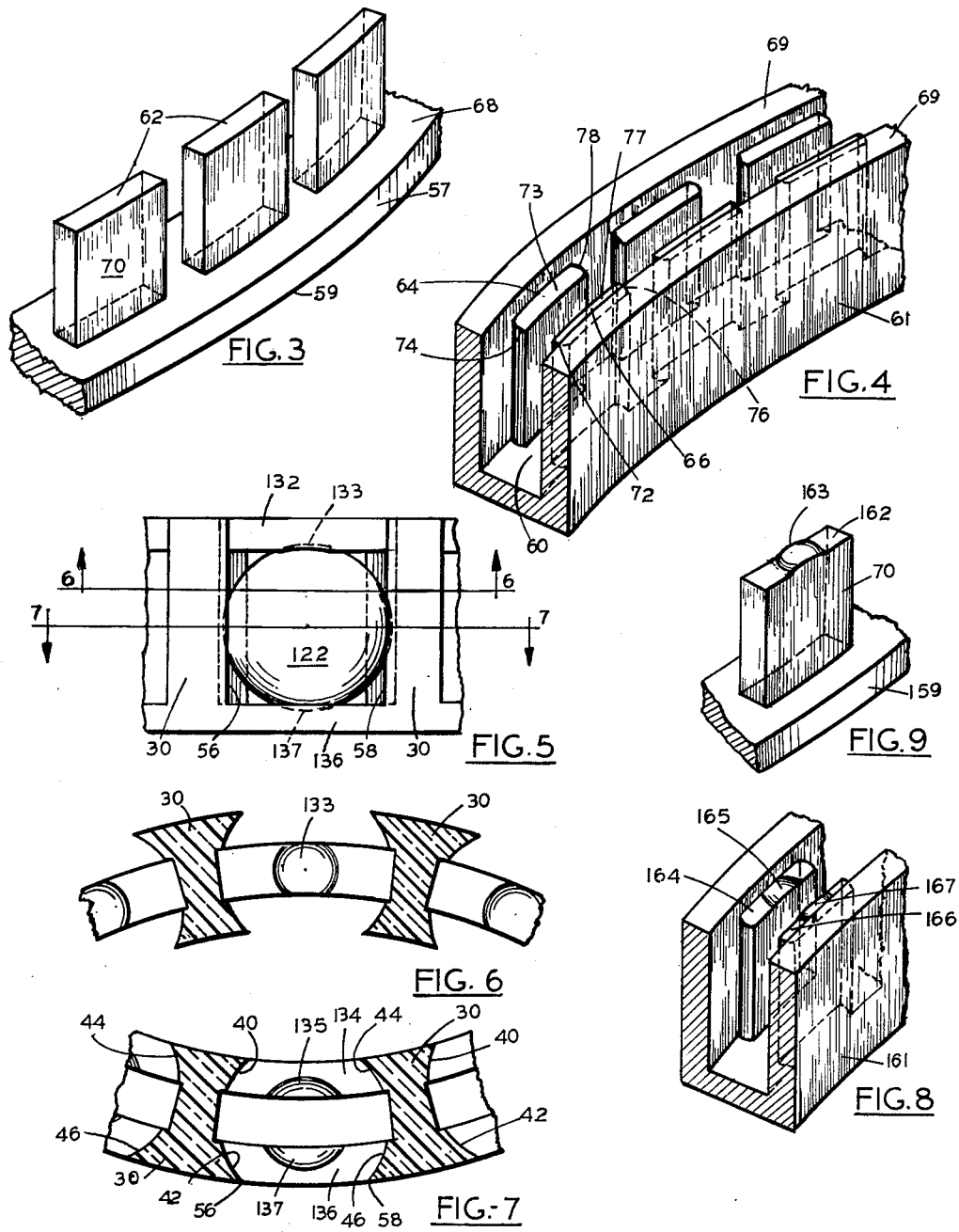

July 21, 1964  H. J. BIEDINGER  3,141,711
BEARING CAGE
Filed Dec. 7, 1961  3 Sheets-Sheet 3
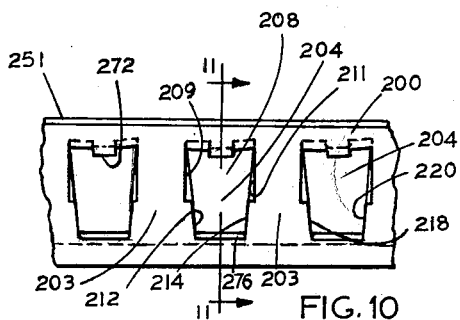
FIG. 10
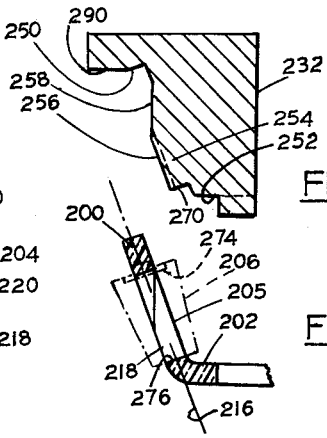
FIG. 15
FIG. 11
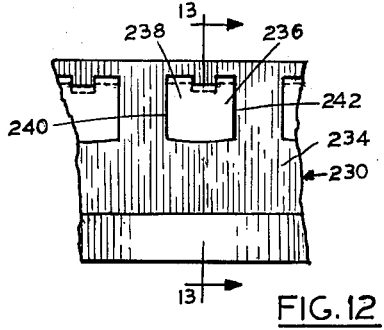
FIG. 12
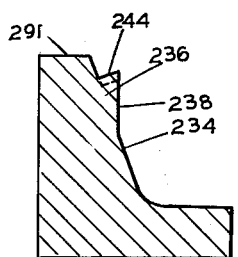
FIG. 13
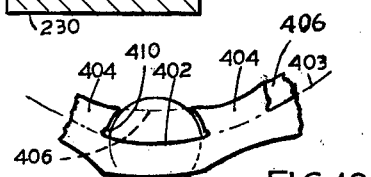
FIG. 18
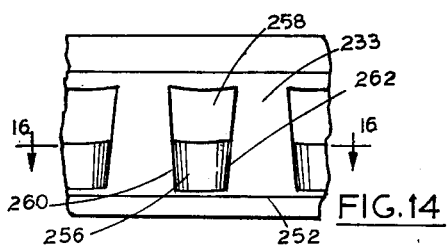
FIG. 14
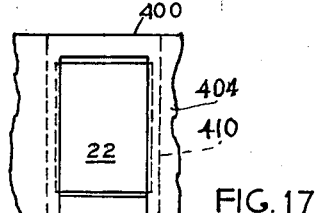
FIG. 17
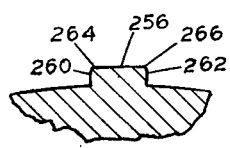
FIG. 16
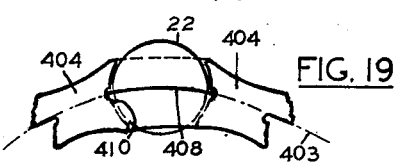
FIG. 19
INVENTOR.
HENRY J. BIEDINGER
BY
ATTORNEY

United States Patent Office 3,141,711
Patented July 21, 1964

3,141,711
BEARING CAGE
Henry J. Biedinger, Syracuse, N.Y., assignor to The Syracuse Stamping Company, Inc., Syracuse, N.Y., a corporation of New York
Filed Dec. 7, 1961, Ser. No. 157,790
6 Claims. (Cl. 308—201)

This invention relates to anti-friction bearings of the roller, including ball bearing type, and more particularly to roller and ball retaining cages or retainers therefor capable of being molded by a simple two part mold.

It has been the practice to provide retainers for the rollers, fabricated from sheet metal requiring multiple forming operations, or sheet metal and spacers requiring fabrication operations, all of which are costly. The present invention is directed to the construction of one piece molded cages for the rollers of roller bearings which may be molded from a simple two part mold. Such cages may be made of nylon or other suitable plastics, which are oil resistant, and which have the requisite strength. Reference to "rollers" or roller bearings herein is intended to include cylindrical roller, ball roller as well as tapered rollers, since as will appear, the invention is equally applicable to all.

The above and other features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 3 is a fragmentary perspective view of one part of the retainer mold;

FIGURE 4 is a fragmentary perspective of the other part of the retainer mold;

FIGURE 5 is a fragmentary side elevation of a ball bearing molded retainer;

FIGURE 6 is a section taken on the line 6—6 of FIGURE 5;

FIGURE 7 is a section taken on the line 7—7 of FIGURE 5;

FIGURE 8 is fragmentary perspective view of one part of a mold for the retainer of FIGURES 5, 6 and 7;

FIGURE 9 is a fragmentary perspective view of the other part of the mold for the retainer of FIGURES 5, 6, and 7;

FIGURE 10 is a fragmentary side elevation of a molded tapered bearing retainer;

FIGURE 11 is a sectional view taken on the line 11—11 of FIGURE 10;

FIGURE 12 is a fragmentary side elevational view radially outward of the outer mold part for molding the retainer of FIGURES 10 and 11;

FIGURE 13 is a sectional view taken on the line 13—13 of FIGURE 12;

FIGURE 14 is a fragmentary side elevational view radially inward of the other mold part for molding the retainer of FIGURES 10 and 11;

FIGURE 15 is a sectional view taken on the line 15—15 of FIGURE 14;

FIGURE 16 is a sectional view taken on the line 16—16 of FIGURE 14;

FIGURE 17 is a fragmentary outside elevational view of a modified form of cylindrical roller cage;

FIGURE 18 is a top view of FIGURE 17; and

FIGURE 19 is a bottom view of FIGURE 17.

Figure 2:
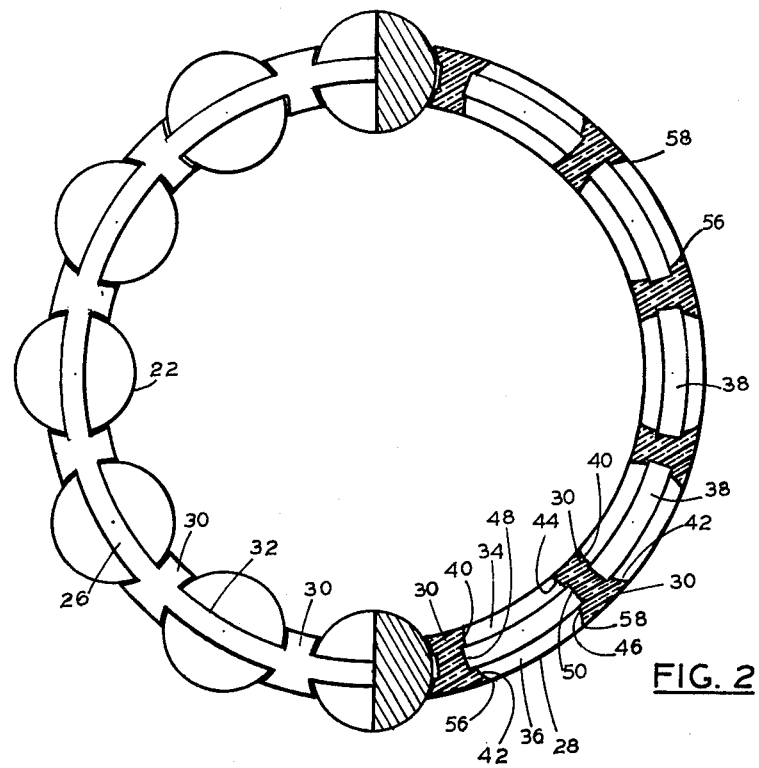
FIGURE 2 is a plan view of the bearing with parts in section taken substantially on the line 2—2 of FIGURE 1.
Figure 1:
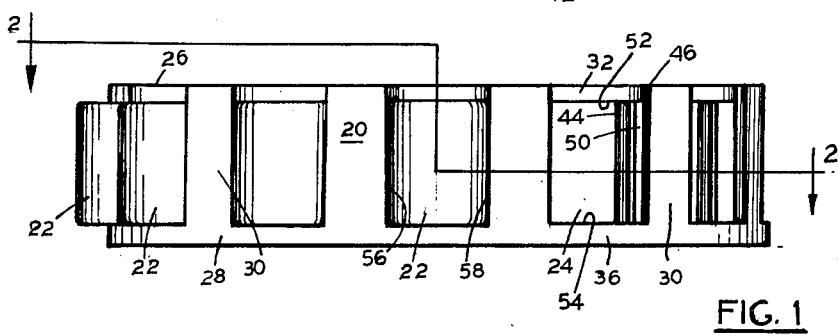
FIGURE 1 is a side elevation of a roller bearing molded cage, with certain of the rollers removed.

In FIGURES 1 and 2 there is shown a roller bearing cage or retainer 20 having a plurality of cylindrical rollers 22 disposed in openings 24 formed between end annuli 26 and 28 joined integrally with spaced columns 30. As shown, the upper annulus comprises arcuate elements 32 integrally connecting the upper end of adjacent columns 30. The lower annulus 28 comprises spaced arcuate elements 34 and 36 integrally connecting the lower ends of adjacent columns 30. The arcuate elements 34 and 36 are spaced apart, leaving an arcuate opening 38, which is at least as wide as the elements 32, for reasons which will appear hereinafter. Each column 30 is provided with arcuate faces 40 and 42, and 44 and 46. Such faces may be separated by paraxial extending grooves 48 and 50 of a radial width corresponding to the width of the openings 38. The spacing between the facing surfaces 52 and 54 of the elements 32 and 34 and 36 will be slightly greater than the axial length of the rollers, and the radius of the arcuate faces 40, 42, 44 and 46 will be slightly greater than the radius of the rollers, and the outer edges 56 and 58 of each opening will preferably be a trifle less than the diameter of the rollers, so as to permit insertion of the rollers into the cage, through the resiliency of the plastic of which the cage is molded. The rollers will thereby be held in their respective openings within the cage, unless it is desired to dislodge a roller by forcing it radially outward of the cage, resiliently expanding the distance between the edges 56 and 58 for the purpose.

In FIGURES 3 and 4 are shown fragmentary sections of the two mold parts 59 and 61, which are adapted to form the cage or retainer 20. When the upper mold part, FIGURE 3, is inserted into the lower mold part, FIGURE 4, the surfaces 60 and 62 are spaced to form the elements 32 and column ends, and the surfaces 64 and 66 and 68, form the elements 34 and 36 and column ends. The projection 70 forms the arcuate apertures 38; the faces 48 and 50, and the arcuate surfaces 78 and 74 of the lands 73 form the surfaces 42 and 46; while the arcuate surfaces 76 and 72 of the lands 77 form the arcuate surfaces 40 and 44. The mold is closed when the surface 68 seats on the upper surfaces 69 of the mold 61.

The bearing cage, by slight modification may be employed for balls 122 as is indicated in FIGURES 5, 6 and 7. As shown, the spacing between the inside surfaces of the integral connecting elements 132, and 134 and 136 will be just under that of the ball diameter, and the elements 132, 134 and 136 will have spherical concavities 133, 135 and 137 respectively, of a radius slightly greater than the ball radius. Likewise the radius of the surfaces, which are cylindrical, 40, 42, 44 and 46 will be slightly greater than the ball radius, and the spacing between the outer edges 56 and 58 of adjacent columns 30 will be just under the ball diameter. Thus the balls may be sprung into place by resiliently spreading the adjacent outer edges 56 and 58 of the columns, and by spreading the elements 132 and 136 slightly in an axial direction.

In order to mold the cage of FIGURES 5, 6 and 7 for ball retention, the mold parts of FIGURES 3 and 4 are modified as is shown in FIGURES 8 and 9, the end surface 162 of the projections 70 having a slight convex spherical surface 163, and the upper ends of the surfaces 164 and 166 being provided with like spherical surfaces 165 and 167, the mold parts 159 and 161, being otherwise substantially identical to that shown in FIGURES 3 and 4, if the rollers to be accommodated by the cage to be formed by the molds of FIGURES 3 and 4 have a length slightly shorter than their diameter.

In FIGURES 10 and 11 are shown a molded retainer for tapered rollers of a tapered roller bearing, capable of being molded by two mold parts separable axially. The retainer comprises an outer annulus 200, and inner annulus 202, with windows or apertures 204 formed by spaced columns 203 to receive tapered rollers 206. The upper portion 208 of the aperture 204 is formed by a rectangular sectioned projection on the outer mold part, and the lower portion of the aperture is formed by a tapered projection on the inner mold part. The upper portions 209 and 211 of the side wall of the upper portion 208 of each aperture 204 is a planar face, the plane of which is parallel with the axis of the bearing retainer. The lower portions 212 and 214 of the side walls of each aperture are concave and conical on an axis as indicated at 216, the varying diameters of which are slightly larger than the corresponding diameters of the conical rollers for which the cage is designed. The outer edges 218 and 220 of the conical recess are preferably spaced slightly less than the corresponding diameter of the conical rollers to be inserted into the cage, whereby the resiliency of the cage material will permit assembly, but yet retain the conical rollers in place.

FIGURES 12–16, are illustrative of the outer and inner two mold parts 230 and 232 adapted to form the retainer of FIGURES 10 and 11. In FIGURE 12 the internal cavity wall of the outer mold 230 is shown at 234, such wall being conical. For each window there is provided a rectangular section projection 236, having a flat wall 238 the plane of which is parallel with the mold axis, and triangular planar side walls 240 and 242, the planes of which are likewise parallel with the mold axis. The upper end 244 of the projection forms the under surface 245 of the tapered roller opening.

The upper mold part 232 FIGURE 15, has an annular groove 250 to form the outer surface 251 of the upper annulus 200, and an annular groove 252 to form the inner interned annulus 202. The mold 232 also has a conical convex face 233 to match the internal surfaces 205 of the columns 203. A projection 254 is formed for each tapered roller window, having an outer convex conical surface 256, corresponding to the radius of the conical surface 234, and a planar face 258 adapted to engage the face 238, and conical side faces 260 and 262 which are adapted to form a tapered roller recess closely fitting the tapered rollers of the bearing, but with adequate running clearance. The edges 264 and 266 of the projection are spaced just under the corresponding tapered roller diameter, to allow insertion of tapered rollers into the cage by elastically springing the window columns 203. The lower face 270 is planar and on a plane transverse to the axis 216 of a roller. The mold is closed when the surface 290 of mold 232 is seated on the surface 291 of mold 230.

In practice, the upper end of the windows 204 may have a slight central projection 272 to interfit with a concavity 274 in the upper end of the tapered roller, and the lower end of the projection is spaced from the lower end 276 of the window by an amount just short of the length of the tapered rollers, whereby the tapered rollers may be snapped in place by spreading the columns 203, as well as the upper and lower annuli 200 and 202.

While the cylindrical roller cage of FIGURES 1 and 2 has been shown as having upper central elements 32, and spaced lower elements 34 and 36, a cage may be formed by a simple two part mold, separated axially, and following the concepts herein set forth by forming the cage as shown in FIGURES 17, 18 and 19 wherein the upper annulus 400 is notched inwardly to the circular center line 403 as at 402 between column 404, and the lower annulus 406 is notched outwardly as at 408 to the center line. In such case the two mold parts will be complemental as before, and each will have lands of a cross sectional configuration corresponding to the notches 402 and 408; that is the outwardly facing cylindrical surface of the internal mold will have lands corresponding to the notches 402, and the inwardly facing cylindrical surface of the outer mold will have lands corresponding to the notches 408. The lands of the mold parts may each have a small half bead to form a groove as at 410 to eliminate flash along the side edges of the abutting lands.

It will be seen from the foregoing that the outer and inner rings, or annuli, between the rolling element separating columns, in each form are offset radially so that the two part mold may be closed and opened by relative axial movement of the mold parts.

While several modifications of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A one piece molded plastic rolling element retainer for an anti-friction bearing comprising first and second annuli integrally connected by rolling element spacing columns to define rolling element receiving windows, the portions of the first annulus between adjacent columns being of reduced radial width, and the portion of the second annulus between adjacent columns comprising radially inner and outer arcuate members spaced radially by an amount at least as great as the radial width of the first annulus portions, and being offset inwardly and outwardly radially of the said first annulus portions.

2. A one piece molded plastic rolling element retainer for an anti-friction bearing comprising first and second annuli integrally connected by rolling element spacing columns to define rolling element receiving windows, the portions of the first annulus between adjacent columns being of reduced radial width, and the portions of the second annulus between adjacent columns comprising radially inner and outer arcuate members spaced radially by an amount at least as great as the radial width of the first annulus portions, and being offset inwardly and outwardly radially of the said first annulus portions, said adjacent columns having facing concave cylindrical surfaces of a radius slightly greater than the radius of the rolling element to be received in the retainer windows and being of uniform section between the spaced annuli.

3. A one piece molded slightly resilient plastic rolling element retainer for an anti-friction bearing comprising first and second annuli integrally connected by rolling element spacing columns to define rolling element receiving windows, the portions of the first annulus between adjacent columns being of reduced radial width, and the portions of the second annulus between adjacent columns comprising radially inner and outer arcuate members spaced radially by an amount at least as great as the radial width of the first annulus portions, and being offset inwardly and outwardly radially of the said first annulus portions, said adjacent columns having facing concave cylindrical surfaces of a radius slightly greater than the radius of the rolling elements to be received in the retainer windows and being of uniform section between the spaced annuli, and the outer edges of said surfaces having a spacing slightly less that the diameter of the rolling elements to be received in the retainer windows.

4. An anti-friction bearing comprising a one piece molded slightly resilient plastic rolling element retainer comprising first and second annuli integrally connected by rolling element spacing columns to define rolling element receiving windows, the portions of the first annulus between adjacent columns being of reduced radial width, and the portions of the second annulus between adjacent columns comprising radially inner and outer arcuate members spaced radially by an amount at least as great as the radial width of the first annulus portions, and being offset inwardly and outwardly radially of the said first annulus portions, rolling elements disposed between each pair of adjacent columns, said adjacent columns having facing concave cylindrical surfaces of a radius slightly greater than the radius of the rolling elements disposed in the retainer windows and being of uniform section between the spaced annuli, and the outer edges of said surfaces having a spacing slightly less than the diameter of said rolling elements.

5. A bearing according to claim 4, wherein the rolling elements are cylindrical and of a length slightly less than the spacing between the first and second annuli.

6. A bearing according to claim 4, wherein the rolling elements are balls and the spacing between the first and second annuli is less than the diameter of the balls, and in which the portions of said annuli between adjacent columns have spherical concavities of a radius slightly greater than the radius of the balls.

References Cited in the file of this patent

UNITED STATES PATENTS

| | | |
|---|---|---|
| 1,188,632 | Dohner et al. | June 27, 1916 |
| 1,787,214 | Shafer | Dec. 30, 1930 |
| 1,909,617 | Hektner | May 16, 1933 |
| 2,418,322 | Spicacci | Apr. 1, 1947 |

FOREIGN PATENTS

| | | |
|---|---|---|
| 1,145,720 | France | May 13, 1957 |
| 1,194,422 | France | May 11, 1959 |
| 817,744 | Great Britain | Aug. 6, 1959 |